(12) United States Patent
Oda et al.

(10) Patent No.: US 10,040,912 B2
(45) Date of Patent: Aug. 7, 2018

(54) METHOD FOR GRANULATING POLYAMIDE OR POLYAMIDE COMPOSITION

(71) Applicant: Mitsubishi Gas Chemical Company, Inc., Tokyo (JP)

(72) Inventors: Takafumi Oda, Kanagawa (JP); Takashi Nakamura, Niigata (JP); Hideyuki Kurose, Niigata (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 184 days.

(21) Appl. No.: 15/114,754

(22) PCT Filed: Jan. 8, 2015

(86) PCT No.: PCT/JP2015/050388
§ 371 (c)(1),
(2) Date: Jul. 27, 2016

(87) PCT Pub. No.: WO2015/115148
PCT Pub. Date: Aug. 6, 2015

(65) Prior Publication Data
US 2016/0347915 A1  Dec. 1, 2016

(30) Foreign Application Priority Data

Jan. 31, 2014 (JP) ................................ 2014-017241

(51) Int. Cl.
*B01J 2/26* (2006.01)
*C08J 3/12* (2006.01)
(Continued)

(52) U.S. Cl.
CPC . *C08J 3/12* (2013.01); *B01J 2/26* (2013.01); *B29B 9/12* (2013.01); *B29B 13/04* (2013.01);
(Continued)

(58) Field of Classification Search
None
See application file for complete search history.

(56) References Cited

U.S. PATENT DOCUMENTS

| 5,609,887 A | 3/1997 | Froeschke | |
| 5,766,642 A * | 6/1998 | Froeschke | B01J 2/20 222/255 |
| 2011/0017130 A1* | 1/2011 | Schromm | B01J 2/04 118/300 |

FOREIGN PATENT DOCUMENTS

| JP | S63-162030 A | 7/1988 |
| JP | H05-031719 A | 2/1993 |

(Continued)

OTHER PUBLICATIONS

International Search Report dated Mar. 24, 2015 for PCT/JP2015/050388 and English translation of the same (2 pages).

*Primary Examiner* — Mary Lynn F Theisen
(74) *Attorney, Agent, or Firm* — Fitch, Even, Tabin & Flannery LLP

(57) ABSTRACT

The present invention provides a method for granulating a polyamide or a polyamide composition, whereby it becomes possible to granulate even a polyamide that has such a melt viscosity that the polyamide cannot be pelletized into a strand-like shape easily. In the present invention, a polyamide, whose melt viscosity at glass transition temperature+160° C. and a shear rate of 100 $s^{-1}$ is 3 Pa·s to 200 Pa·s and whose terminal amino group concentration is 5 µeq/g to 70 µeq/g, is melted by heating to a range of glass transition temperature+160° C. to glass transition temperature+180° C. of the polyamide, and then is solidified by dropping the molten polyamide in the form of granules onto a metallic belt, thereby producing granules.

9 Claims, 5 Drawing Sheets

(51) Int. Cl.
    *C08G 69/26*     (2006.01)
    *C08L 77/06*     (2006.01)
    *B29B 9/12*     (2006.01)
    *B29B 13/04*     (2006.01)
    *C08G 69/28*     (2006.01)
    *C08G 69/32*     (2006.01)
    *B29K 77/00*     (2006.01)
    *B29K 105/00*     (2006.01)

(52) U.S. Cl.
    CPC ........... *C08G 69/26* (2013.01); *C08G 69/265* (2013.01); *C08G 69/28* (2013.01); *C08G 69/32* (2013.01); *C08L 77/06* (2013.01); *B29K 2077/00* (2013.01); *B29K 2105/0067* (2013.01); *C08J 2377/06* (2013.01)

(56) References Cited

FOREIGN PATENT DOCUMENTS

| | | |
|---|---|---|
| JP | H07-009439 A | 1/1995 |
| JP | H08-507001 A | 7/1996 |
| JP | 2003-033913 A | 2/2003 |
| WO | 2005/023530 A1 | 3/2005 |

\* cited by examiner

METHOD FOR GRANULATING POLYAMIDE OR POLYAMIDE COMPOSITION

CROSS-REFERENCE TO RELATED APPLICATIONS

This application is a U.S. national phase application filed under 35 U.S.C. § 371 of International Application PCT/JP2015/050388, filed on Jan. 8, 2015, designating the United States, which claims priority from Japanese Application Number 2014-017241, filed Jan. 31, 2014, which are hereby incorporated herein by reference in their entirety.

TECHNICAL FIELD

The present invention relates to a method for granulating a polyamide or a polyamide composition. More particularly, the present invention relates to a method for granulating a polyamide or a polyamide composition, which is capable of granulating a polyamide or a polyamide composition having a low melt viscosity in a stable manner with less variation in the shape.

BACKGROUND ART

Since polyesters as typified by polyethylene terephthalate (PET) or the like is characterized by excellent transparency, mechanical properties, melt stability, aroma retainability, recyclability and the like, they are currently widely used for various packaging materials such as films, sheets and hollow containers.

Since the gas barrier properties of polyesters against oxygen, carbon dioxide gas or the like are not always sufficient, improvement of the gas barrier property has been attempted by melt-blending a polyester with polymetaxylene adipamide (MXD6) which has a high gas barrier property and whose molding temperature is close to PET. However, a compact prepared by using a resin composition containing a polyester and polymetaxylene adipamide has inadequate transparency, and thus there is a restriction on the use thereof for use that requires high transparency.

Conventionally, a strand cut system is employed in a method for granulating a resin, where a resin is melt-kneaded in an extruder, extruded into a strand shape from the die surface of the extruder, cooled by water cooling or air cooling, and then cut with a cutter to obtain granules (pellets). If the melt viscosity of the resin is too low, however, the resin cannot be molded into a strand shape, and thus cannot be granulated by this method.

As another method, an underwater hot-cut system is known, in which a resin is melt-kneaded in an extruder, and then the molten resin is extruded from the die surface of the extruder into water, and cut with a rotary blade near the die surface. However, since the die surface is directly exposed in warm water, heat loss is significant. Thus, the temperature of the die needs to be set at a high temperature, which tends to cause a problem of resin burning at the die part.

If a high-viscosity resin is used, an air hot-cut system can be employed in which a resin is melt-kneaded in an extruder, then allowed to flow out from the die of the extruder, and cut with a rotating knife near the die surface (Patent Literature 2: Japanese Unexamined Patent Application Publication No. Heisei 7-9439). This method, however, is difficult to be applied to a low-viscosity resin, and thus there has been a need for a good method for granulating a low-viscosity resin with less variation in the shape.

As a method for granulating a high-viscosity resin, a method is proposed in which a resin is melted by heating in an extruder, supplied into recesses provided in a main drum for solidification by cooling, and the resulting granules is taken out by vacuum suction to obtain granules (Patent Literature 3: Japanese Unexamined Patent Application Publication No. 2003-33913). This publication describes, in the section under "Prior Art", that if a liquid material in the molten state has a low viscosity, droplets can be dropped continuously onto a cooling belt for solidification by cooling so that granules can easily be produced by removing them off from the cooling belt. However, even if droplets of a resin in the molten state can be dropped continuously onto a cooling belt, there were some cases where the granules were practically hard to remove from the cooling belt without a special device. In particular, when a polyamide is to be granulated, adhesiveness between the polyamide and the metal of the cooling belt may be too high such that it is hard to remove the granulated polyamide from the cooling belt, which leads to problems of damaging the granulated pellets or causing cobwebbing or the like upon removal.

CITATION LIST

Patent Literature

Patent Literature 1: International Publication No. 2005/023530
Patent Literature 2: Japanese Unexamined Patent Application Publication No. Heisei 7-9439
Patent Literature 3: Japanese Unexamined Patent Application Publication No. 2003-33913

SUMMARY OF INVENTION

Under such circumstances, there is a need for a method for granulating a resin having a low melt viscosity. Specifically, there is a need for a method for granulating a polyamide or a polyamide composition which allows granules to be obtained stably with little variation in the shapes.

Considering the above-described problems, the present inventors have gone through extensive studies, as a result of which found that by controlling the melt viscosity and the terminal amino group concentration of a polyamide or a polyamide composition to lie within a predetermined range upon melting the polyamide or the polyamide composition by heating and dropping the resultant onto a metal belt for solidification to obtain granules, granules can be obtained with little variation in the shape and without cobwebbing and the like, and the granules after solidification by cooling can easily be removed from the metal belt without using a special means and thus granules can stably be obtained, thereby achieving the present invention.

Thus, the present invention provides a method for granulating a polyamide as well as a method for granulating a polyamide composition shown below.

[1] A method for granulating a polyamide, comprising the steps of:

melting polyamide (A), whose melt viscosity at glass transition temperature+160° C. and a shear rate of 100 s$^{-1}$ is 3 Pa·s to 200 Pa·s and whose terminal amino group concentration is 5 µeq/g to 70 µeq/g, by heating to a range of glass transition temperature+160° C. to glass transition temperature+180° C.; and dropping the resultant in the molten state in granular forms onto a metal belt for solidification to obtain granules.

[2] The method for granulating a polyamide according to [1], wherein polyamide (A) is polyamide (A1) which comprises a diamine unit containing an aromatic diamine unit represented by General Formula (I-1) below or an alicyclic diamine unit represented by General Formula (I-2) below for 70 mol % or more, and a dicarboxylic acid unit containing at least one of a linear aliphatic dicarboxylic acid unit represented by General Formula (II-1) below and an aromatic dicarboxylic acid unit represented by General Formula (II-2) below for a total of 50 mol % or more:

[Chemical 1]

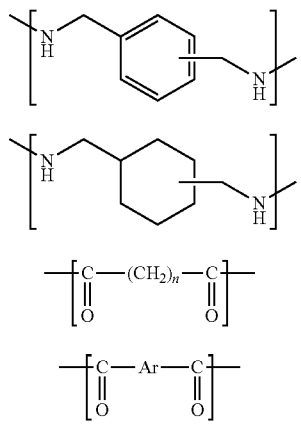

wherein, in Formula (II-1), n represents an integer of 2-18, and in Formula (II-2), Ar represents an arylene group.

[3] The method for granulating a polyamide according to either one of [1] and [2], wherein the number average molecular weight derived from the terminal group concentration of polyamide (A) is 2000 to 13000.

[4] The method for granulating a polyamide according to any one of [1] to [3], wherein a fore device of the metal belt comprises a normal pressure type or an applied pressure type melt polymerization vessel, and polyamide (A) in the molten state obtained by melt polymerization is continuously dropped in granular forms onto the metal belt and solidified to obtain granules.

[5] The method for granulating a polyamide according to any one of [1] to [3], wherein a fore device of the metal belt comprises a single-screw or a twin-screw extruder, and polyamide (A) in the molten state is continuously dropped in granular forms onto the metal belt and solidified to obtain granules.

[6] A method for granulating a polyamide composition, comprising the steps of:
melting polyamide composition (B), which is obtained by mixing polyamide (A), whose melt viscosity at glass transition temperature+160° C. and a shear rate of 100 s$^{-1}$ is 3 Pa·s to 200 Pa·s and whose terminal amino group concentration is 5 µeq/g to 70 µeq/g, with at least one of additional resin (C) and additive (D), by heating to a range of glass transition temperature+160° C. to glass transition temperature+180° C.; and
dropping the resultant in the molten state in granular forms onto a metal belt for solidification to obtain granules.

[7] The method for granulating a polyamide composition according to [6], wherein polyamide (A) is polyamide (A1) which comprises a diamine unit containing an aromatic diamine unit represented by General Formula (I-1) below or an alicyclic diamine unit represented by General Formula (I-2) below for 70 mol % or more, and a dicarboxylic acid unit containing at least one of a linear aliphatic dicarboxylic acid unit represented by General Formula (II-1) below and an aromatic dicarboxylic acid unit represented by General Formula (II-2) below for a total of 50 mol % or more:

[Chemical 2]

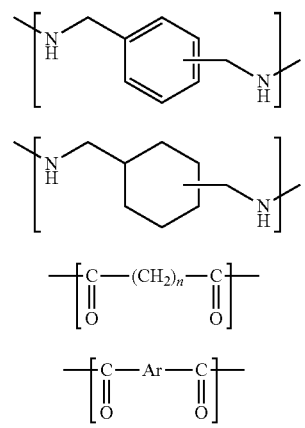

wherein, in Formula (II-1), n represents an integer of 2-18, and in Formula (II-2), Ar represents an arylene group.

[8] The method for granulating a polyamide composition according to either one of [6] and [7], wherein the number average molecular weight derived from the terminal group concentration of polyamide (A) is 2000 to 13000.

[9] The method for granulating a polyamide composition according to any one of [6] to [8], wherein a fore device of the metal belt comprises a single-screw or a twin-screw extruder, and after melt-blending polyamide (A) with at least one of additional resin (C) and additive (D), the resulting mixture in the molten state is continuously dropped in granular forms onto the metal belt and solidified to obtain granules.

The present invention is capable of granulating a polyamide having a low viscosity or a composition containing the same, and is capable of stably producing granules with little variation in the shape and less cobwebbing and the like.

DESCRIPTION OF EMBODIMENTS

Hereinafter, preferable embodiments of a method for granulating a polyamide and a method for granulating a polyamide composition according to the present invention will be described specifically.

1. Method for Granulating Polyamide

A method for granulating a polyamide according to the present invention comprises the steps of: melting polyamide (A), whose melt viscosity at glass transition temperature+160° C. and a shear rate of 100 s$^{-1}$ is 3 Pa·s to 200 Pa·s and whose terminal amino group concentration is 5 µeq/g to 70 µeq/g, by heating to a range of glass transition temperature+160° C. to glass transition temperature+180° C.; and dropping the resultant in the molten state in granular forms onto a metal belt for solidification to obtain granules.

Figure 1:
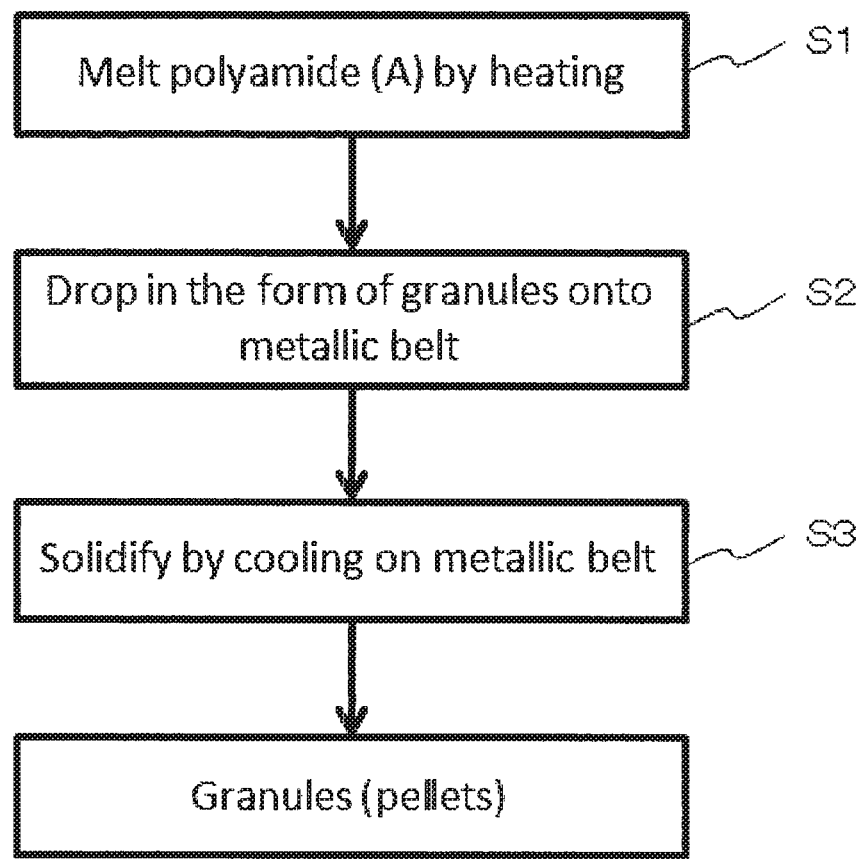
FIG. 1 A flowchart of a method for granulating a polyamide according to one embodiment of the present invention.

FIG. 1 is a flowchart of a method for granulating a polyamide according to one embodiment of the present invention. As shown in FIG. 1, the method for granulating a polyamide according to one embodiment of the present invention comprises: a step of melting polyamide (A) by heating (S1); a step of dropping polyamide (A) in granular forms onto a metal belt (S2); and a step of solidifying the resultant by cooling on the metal belt (S3).

Figure 2:
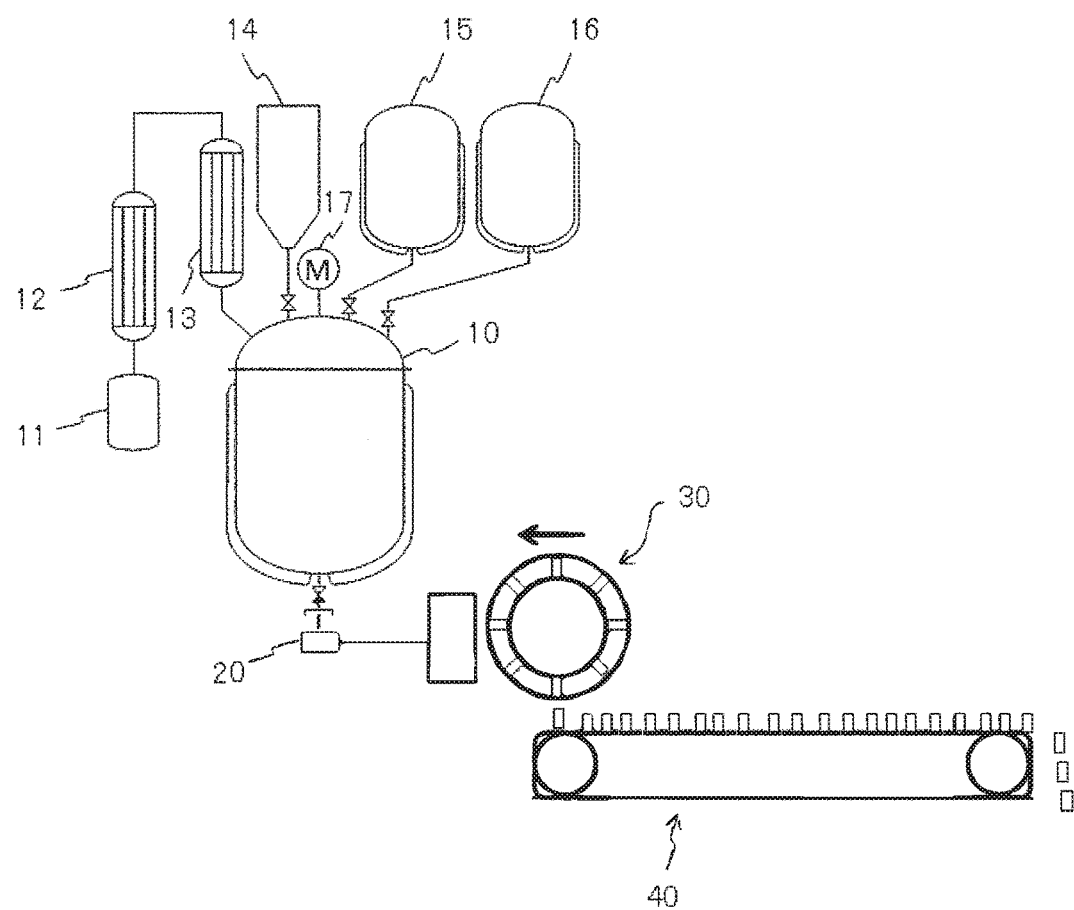
FIG. 2 A schematic view showing an exemplary device used with a method for granulating a polyamide according to one embodiment of the present invention.
Figure 3:
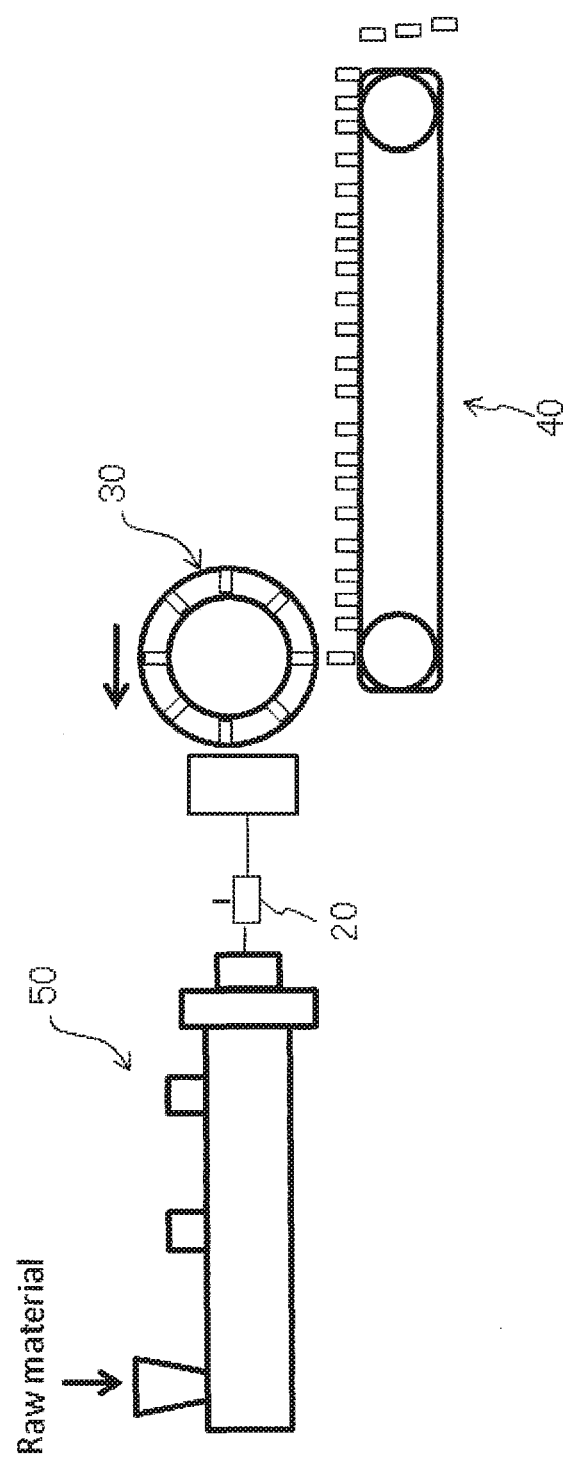
FIG. 3 A schematic view showing an exemplary device used with a method for granulating a polyamide according to one embodiment of the present invention.
Figure 4:
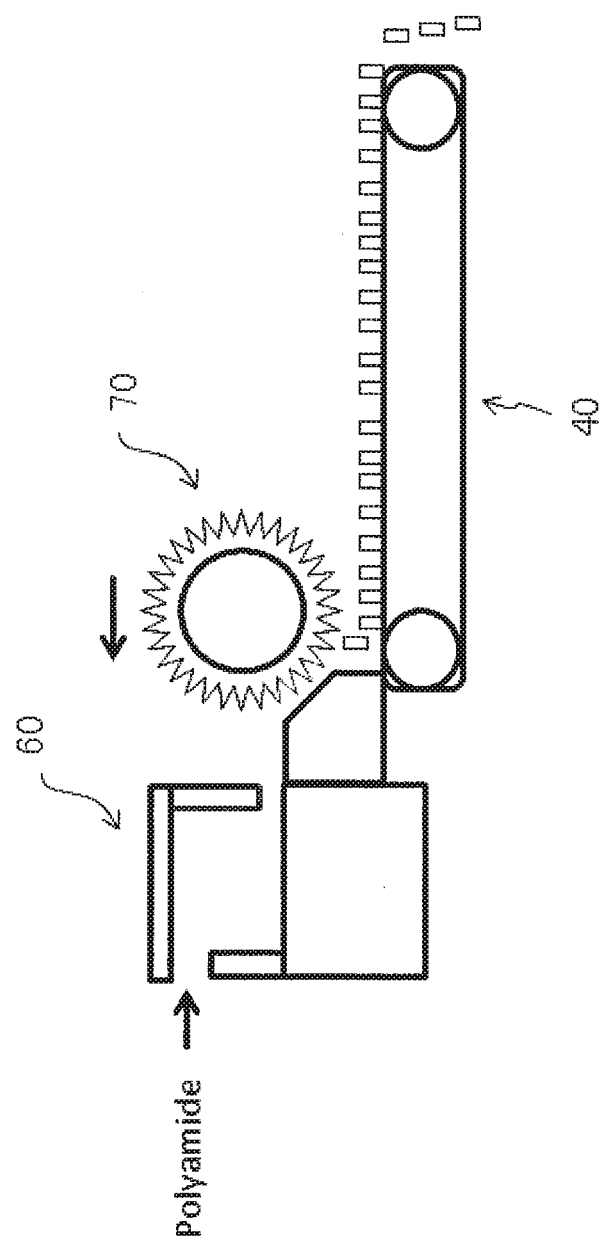
FIG. 4 A schematic view showing an exemplary device used with a method for granulating a polyamide according to one embodiment of the present invention.

FIGS. 2 to 4 are schematic views each showing an exemplary device used in the method for granulating a polyamide according to one embodiment of the present invention.

In the method for granulating a polyamide according to one embodiment of the present invention, for example, a polyamide is polycondensed and is melted by heating in a reaction vessel and the polyamide still in the molten state is continuously dropped in granular forms onto a metal belt for solidification to obtain granules. For example, as shown in FIG. 2, dicarboxylic acid is fed from a dicarboxylic acid tank 16 into a melt polymerization vessel 10 equipped with a distilled water receiving tank 11, a total condenser 12, a partial condenser 13, a hopper for comonomer 14, a diamine tank 15, a dicarboxylic acid tank 16 and an agitator 17. After nitrogen substitution, the melt polymerization vessel 10 is sealed, the temperature is elevated while agitating, and diamine is dropped from the diamine tank 15 to the molten raw material for polyamide polycondense. At this point, the generated condensation water is preferably transferred to the distilled water receiving tank 11 via the partial condenser 13 and the total condenser 12. After dropping diamine, the agitation torque of the agitator 17 is observed to stop the agitation once a predetermined torque is reached. Pressure is applied inside the melt polymerization vessel 10 with nitrogen, and a bottom discharge valve is opened to transfer the resulting polyamide in the molten state to a pastillator 30 such as Rotoformer manufactured by Sandvik using a gear pump 20. The pastillator 30 is used to drop the polyamide in granular forms onto a metal belt 40. The dropped polyamide is solidified by cooling on the metal belt during the process of conveyance, and removed from the metal belt as granules.

In a method for granulating a polyamide according to other embodiment of the present invention, a single-screw or a twin-screw extruder may be used instead of the melt polymerization vessel 10. For example, as shown in FIG. 3, a polyamide raw material is fed into an extruder 50 to be melted by heating and kneaded. The resulting polyamide still in the molten state is directly transferred to a pastillator 30 such as Rotoformer placed at the end of the extruder using a gear pump 20. The pastillator 30 can be used to drop the polyamide in granular forms onto a metal belt 40. As raw materials of the polyamide, a diamine component and dicarboxylic acid may directly be loaded, or a polyamide salt or a polyamide oligomer with a number average molecular weight of 2000 or less may be prepared in advance using a melt polymerization vessel, other extruder or the like, which may then be loaded.

In a method for granulating a polyamide according to other embodiment of the present invention, a polyamide produced and melted by heating in advance in a fore device such as a melt polymerization vessel, or an extruder is dropped in granular forms onto a metal belt using a pastillator such as a roller-drop type pastillator for solidification to obtain granules. For example, as shown in FIG. 4, the polyamide melted by heating in the fore device, still in the molten state, is fed into a material feeder 60 of a roller-drop type pastillator. The polyamide in the molten state fed from the material feeder is carried by recesses of a rotator 70 at appropriate amounts to continuously be dropped onto a metal belt 40.

Similar to the above-described embodiment, the dropped polyamide is solidified by cooling during the process of conveyance, and removed from the metal belt as granules.

In one preferable embodiment of the present invention, a fore device of a metal belt comprises a normal pressure type or an applied pressure type melt polymerization vessel, where a polyamide (A) in the molten state obtained by melt polymerization is continuously dropped in granular forms onto the metal belt for solidification to obtain granules. Alternatively, in another preferable embodiment of the present invention, a fore device of a metal belt comprises a single-screw or a twin-screw extruder, where polyamide (A) in the molten state is continuously dropped in granular forms onto the metal belt for solidification to obtain granules.

Since the fore device of the metal belt includes a normal pressure type or an applied pressure type melt polymerization vessel, or a single-screw or a twin-screw extruder, polyamide (A) after melt polymerization can easily be dropped continuously in granular forms without being solidified onto a metal belt. Since polyamide (A) after melt polymerization can be used in the next step without being solidified, heat history of polyamide (A) can be reduced, and a molded article with excellent hue can be obtained.

Herein, the term "fore device" refers to a device that melts polyamide (A) (or polyamide composition (B)) by heating for dropping polyamide (A) (or polyamide composition (B)) onto a metal belt. Other than a melt polymerization vessel or a single-screw or a twin-screw extruder, a specific example includes a melting tank for melting polyamide (A) prepared in advance by heating.

Hereinafter, each of steps in a method for granulating a polyamide according to one embodiment of the present invention will be described specifically.

First, polyamide (A) is melted by heating (Step S1). One feature of the present invention is that polyamide (A), whose melt viscosity at (glass transition temperature+160° C.) and a shear rate of 100 s$^{-1}$ is 3 Pa·s to 200 Pa·s and whose terminal amino group concentration is 5 µeq/g to 70 µeq/g, is used as the polyamide. Since the melt viscosity of the polyamide lies within the above-mentioned range, granules having a consistent particle size with little variation in the shape can be produced without causing cobwebbing or the like upon dropping the polyamide in the molten state onto a metal belt. Moreover, since the terminal amino group concentration of the polyamide stays within 5 µeq/g to 70 µeq/g, the granules can easily be removed from the metal belt after dropping the polyamide onto the metal belt for solidification by cooling, thereby stably producing granules. In addition, the production rate can also be increased.

While the melt viscosity of the polyamide at glass transition temperature+160° C. and a shear rate of 100 s$^{-1}$ is 200

Pa·s or lower, it is preferably 100 Pa·s or lower, more preferably 50 Pa·s or lower, and still more preferably 30 Pa·s or lower. Meanwhile, it is preferably 3 Pa·s or higher, more preferably 4 Pa·s or higher, and still more preferably 5 Pa·s or higher. If the melt viscosity exceeds 200 Pa·s, the polyamide is difficult to be dropped onto a metal belt due to a high viscosity, and thus granulating cannot be realized. Even when the conditions are changed, cobwebbing is caused. The melt viscosity can be measured according to a method described in the example.

While the terminal amino group concentration of the polyamide is 70 μeq/g or lower, it is preferably 65 μeq/g or lower, more preferably 60 μeq/g or lower, and still more preferably 50 μeq/g or lower. Meanwhile, it is preferably 5 μeq/g or higher, more preferably 7 μeq/g or higher, and still more preferably 10 μeq/g or higher. If the terminal amino group concentration of the polyamide exceeds 70 μeq/g, the polyamide will stick onto the metal belt, which hinders stable granulating. On the other hand, if the terminal group concentration of the polyamide is lower than 5 μeq/g, the terminal amino group concentration cannot be controlled upon polycondensation, which is unfavorable. The terminal amino group concentration can be measured according to a method described in the example.

The type of the polyamide that can be used as polyamide (A) in the present invention is not particularly limited as long as it has an amide bond {—NH—C(=O)—} in the repeating structural unit of the polymer main chain.

In general, a polyamide can be obtained through, but not limited to, ring-opening polymerization of a lactam, polycondensation of a diamine and a dicarboxylic acid, polycondensation of an aminocarboxylic acid, or the like.

Examples of the above-described diamine include aliphatic, alicyclic and aromatic diamines. Specific examples include tetramethylene diamine, hexamethylene diamine, undecamethylene diamine, dodecamethylene diamine, tridecamethylene diamine, 1,9-nonane diamine, 2-methyl-1,8-octane diamine, 2,2,4-trimethylhexamethylene diamine, 2,4,4-trimethylhexamethylene diamine, 5-methylnonamethylene diamine, 1,3-bisaminomethylcyclohexane, 1,4-bisaminomethylcyclohexane, m-phenylene diamine, p-phenylene diamine, m-xylylene diamine and p-xylylene diamine.

Examples of the dicarboxylic acid include aliphatic, alicyclic and aromatic dicarboxylic acids. Specific examples include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalenedicarboxylic acid and dimer acid. Examples of the lactam specifically include ε-caprolactam, enantholactam and ω-laurolactam. Furthermore, examples of the aminocarboxylic acid specifically include ε-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

Examples of polyamide (A) that is particularly preferable to be used in the present invention include polyamide 6, polyamide 6,6, polyamide 4,6, polyamide 11, polyamide 12, polyamide 6,10, polyamide 6,12, polyamide 6/6,6, polyamide 6/6,12, polyamide MXD6, polyamide MXD6I, polyamide MXD10, polyamide PXD10, polyamide BAC6, polyamide BAC10, polyamide 6,T, polyamide 6,1, polyamide 6/6,T, polyamide 6/6,1, polyamide 6,6/6,T, polyamide 6,6/6,1, polyamide 6/6,T/6,I, polyamide 6,6/6,T/6,I, polyamide 6/12/6,T, polyamide 6,6/12/6,T, polyamide 6/12/6,1, polyamide 6,6/12/6,1, and polyamide 9,T. Polyamides obtained by copolymerizing multiple polyamides with an extruder or the like may also be used.

While the polyamide (A) that can be used in the present invention is not particularly limited as long as it is a polyamide having the above-described melt viscosity and terminal amino group concentration, it preferably comprises a diamine unit containing an aromatic diamine unit represented by General Formula (I-1) below or an alicyclic diamine unit represented by General Formula (I-2) below, and a dicarboxylic acid unit containing a linear aliphatic dicarboxylic acid unit represented by General Formula (II-1) below or an aromatic dicarboxylic acid unit represented by General Formula (II-2) below:

[Chemical 3]

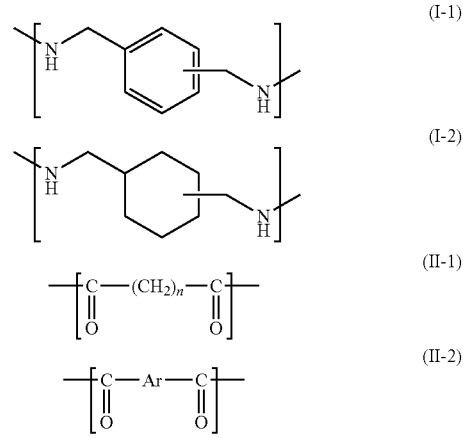

wherein, in Formula (II-1), n represents an integer of 2-18, and in Formula (II-2), Ar represents an arylene group.

Note that the total of the diamine unit and the dicarboxylic acid unit should not exceed 100 mol %. Additionally, polyamide (A) may further contain a structural unit other than those mentioned above within a range that does not impair the effect of the present invention.

The diamine unit in polyamide (A) contains an aromatic diamine unit represented by General Formula (I-1) above or an alicyclic diamine unit represented by General Formula (I-2) above for preferably 50 mol % or more, more preferably 70 mol % or more, still more preferably 80 mol % or more and particularly preferably 90 mol % or more in the diamine unit. The aromatic diamine unit and the alicyclic diamine unit may be used in combination. In this case, the total amount of them should satisfy the above-described range.

Examples of a compound that may constitute an aromatic diamine unit represented by General Formula (I-1) include orthoxylylene diamine, metaxylylene diamine and paraxylylene diamine. These may be used alone or two or more of them may be used in combination.

Examples of a compound that may constitute an alicyclic diamine unit represented by General Formula (I-2) include 1,2-bis(aminomethyl)cyclohexane, 1,3-bis(aminomethyl)cyclohexane and 1,4-bis(aminomethyl)cyclohexane. These may be used alone or two or more of them may be used in combination.

From the perspective that a diamine unit facilitates moldability of a general-purpose thermoplastic resin, in addition to expressing an excellent gas barrier property, it contains a metaxylylene diamine unit for preferably 50 mol % or more, more preferably 70 mol % or more, still more preferably 80 mol % or more and particularly preferably 90 mol % or more.

Examples of a compound that may constitute a diamine unit other than the diamine unit represented by General Formula (I-1) or (I-2) may include, but not limited to, aromatic diamines such as paraphenylene diamine, aliphatic diamines such as 2-methyl-1,5-pentane diamine, 1-amino-3-aminomethyl-3,5,5-trimethylcyclohexane, tetramethylene diamine, hexamethylene diamine, undecamethylene diamine, dodecamethylene diamine, tridecamethylene diamine, 1,9-nonane diamine, 2-methyl-1,8-octane diamine, 2,2,4-trimethylhexamethylene diamine, 2,4,4-trimethylhexamethylene diamine and 5-methylnonamethylene diamine, and polyether-based diamines having an ether bond as represented by JEFFAMINE and ELASTAMINE manufactured by Huntsman (both are trade names). These may be used alone or two or more of them may be used in combination.

Next, from the perspective of reactivity upon polymerization, and the crystalline property and moldability of the polyamide compound, the dicarboxylic acid unit in polyamide (A) contains either a linear aliphatic dicarboxylic acid unit represented by General Formula (II-1) above or an aromatic dicarboxylic acid unit represented by General Formula (II-2) above for a total of preferably 50 mol % or more, more preferably 70 mol % or more, still more preferably 80 mol % or more and particularly preferably 90 mol % or more in the dicarboxylic acid unit. The linear aliphatic dicarboxylic acid unit and the aromatic dicarboxylic acid unit may be used in combination. In this case, the total amount of them should satisfy the above-described range.

Examples of a compound that may constitute a dicarboxylic acid unit other than the dicarboxylic acid unit represented by General Formula (II-1) or (II-2) above may include, but not limited to, dicarboxylic acids such as oxalic acid, malonic acid, fumaric acid, maleic acid, 1,3-benzenediacetic acid and 1,4-benzenediacetic acid.

In the dicarboxylic acid unit in polyamide (A), the content ratio of the above-described linear aliphatic dicarboxylic acid unit and the above-described aromatic dicarboxylic acid unit (linear aliphatic dicarboxylic acid unit/aromatic dicarboxylic acid unit) is not particularly limited and may suitably be determined depending on the intended use. For example, in order to increase the glass transition temperature of polyamide (A) for the purpose of decreasing the crystalline property of polyamide (A), the ratio of linear aliphatic dicarboxylic acid unit/aromatic dicarboxylic acid unit is preferably 0/100 to 60/40, more preferably 0/100 to 40/60, and still more preferably 0/100 to 30/70, provided that the total of both units is 100. Moreover, in order to decrease the glass transition temperature of polyamide (A) for the purpose of imparting flexibility to polyamide (A), the ratio of linear aliphatic dicarboxylic acid unit/aromatic dicarboxylic acid unit is preferably 40/60 to 100/0, more preferably 60/40 to 100/0, and still more preferably 70/30 to 100/0, provided that the total of both units is 100.

For the purpose of imparting flexibility that is necessary as a packaging material or a packaging container, in addition to imparting an appropriate glass transition temperature or a crystalline property to polyamide (A), a linear aliphatic dicarboxylic acid unit represented by General Formula (II-1) above is preferably contained.

In General Formula (II-1) above, n represents an integer of 2-18, preferably 3-16, more preferably 4-12 and still more preferably 4-8.

Examples of a compound that may constitute the linear aliphatic dicarboxylic acid unit represented by General Formula (II-1) above may include, but not limited to, succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid. These may be used alone or two or more of them may be used in combination.

The type of the linear aliphatic dicarboxylic acid unit represented by General Formula (II-1) above can appropriately be determined depending on the intended use. From the perspective of retaining heat resistance after heat sterilization of a packaging material or a packaging container, in addition to imparting an excellent gas barrier property to polyamide (A), the linear aliphatic dicarboxylic acid unit in polyamide (A) of the present invention contains at least one selected from the group consisting of an adipic acid unit, a sebacic acid unit and a 1,12-dodecanedicarboxylic acid unit for a total of preferably 50 mol % or more, more preferably 70 mol % or more, still more preferably 80 mol % or more, and particularly preferably 90 mol % or more in the linear aliphatic dicarboxylic acid unit.

From the perspective of a gas barrier property and thermal properties such as an appropriate glass transition temperature and melting point of polyamide (A), the linear aliphatic dicarboxylic acid unit in polyamide (A) preferably contains an adipic acid unit for 50 mol % or more in the linear aliphatic dicarboxylic acid unit. Furthermore, from the perspective of imparting an appropriate gas barrier property and molding processing suitability to polyamide (A), the linear aliphatic dicarboxylic acid unit in polyamide (A) preferably contains a sebacic acid unit for 50 mol % or more in the linear aliphatic dicarboxylic acid unit, and preferably contains a 1,12-dodecanedicarboxylic acid unit for 50 mol % or more in the linear aliphatic dicarboxylic acid unit in a case of usage that requires low water absorption, weatherability and heat resistance.

For the purpose of facilitating molding processability of a packaging material or a packaging container, in addition to imparting a further gas barrier property to polyamide (A), polyamide (A) preferably contains an aromatic dicarboxylic acid unit represented by General Formula (II-2) above.

In General Formula (II-2) above, Ar represents an arylene group. This arylene group is an arylene group that preferably has a carbon number of 6-30 and more preferably a carbon number of 6-15, examples being a phenylene group and a naphthylene group.

Examples of a compound that may constitute the aromatic dicarboxylic acid unit represented by General Formula (II-2) above include, but not limited to, terephthalic acid, isophthalic acid and 2,6-naphthalenedicarboxylic acid. These may be used alone or two or more of them may be used in combination.

The type of the aromatic dicarboxylic acid unit represented by General Formula (II-2) above can appropriately be determined depending on the intended use. The aromatic dicarboxylic acid unit in polyamide (A) contains at least one selected from the group consisting of an isophthalic acid unit, a terephthalic acid unit and a 2,6-naphthalenedicarboxylic acid unit in the aromatic dicarboxylic acid unit for a total of preferably 50 mol % or more, more preferably 70 mol % or more, still more preferably 80 mol % or more, and particularly preferably 90 mol % or more. Among them, it is preferable to contain isophthalic acid and/or terephthalic acid in the aromatic dicarboxylic acid unit. The content ratio of isophthalic acid unit and terephthalic acid unit (isophthalic acid unit/terephthalic acid unit) is not particularly limited, and may appropriately be determined depending on the intended use. For example, from the perspective of an appropriate glass transition temperature as well as a reduced crystalline property, the content ratio is preferably 0/100 to 100/0, more preferably 0/100 to 60/40, still more preferably 0/100 to 40/60, and yet still more preferably 0/100 to 30/70, provided that the total of both units is 100.

In a preferable aspect of the present invention, from the perspective of the barrier property, the mechanical property and the like, polyamide (A) is preferably polyamide (A1) which comprises a diamine unit containing an aromatic diamine unit represented by General Formula (I-1) or an alicyclic diamine unit represented by General Formula (I-2) for 70 mol % or more, and a dicarboxylic acid unit containing at least one of a linear aliphatic dicarboxylic acid unit represented by General Formula (II-1) or an aromatic dicarboxylic acid unit represented by General Formula (II-2) for a total of 50 mol % or more.

While the number average molecular weight (Mn) of polyamide (A) is not particularly limited in the granulating method of the present invention, it is preferably 2000 or more, more preferably 3000 or more, and still more preferably 4000 or more. Meanwhile, it is 13000 or less, more preferably 10000 or less, and still more preferably 8000 or less. As long as the number average molecular weight is within the above-described range, granules having stable characteristics with less unreacting substance as a polyamide and with little variation in the shape can be obtained causing less cobwebbing or the like. The number average molecular weight can be determined by a method described in the example.

Polyamide (A) can be produced by polycondensing a diamine component that may constitute the above-described diamine unit with a dicarboxylic acid component that may constitute the above-described dicarboxylic acid unit. The polycondensation conditions can be adjusted to control the polymerization degree. Upon polycondensation, a small amount of monoamine or monocarboxylic acid may be added as a molecular weight regulator. Moreover, in order to suppress the polycondensation reaction to achieve a desired polymerization degree, the ratio (molar ratio) of the diamine component and the carboxylic acid component that constitute polyamide (A) can be adjusted by shifting from 1.

Examples of the method for polycondensing polyamide (A) include, but not limited to, a reactive extrusion method, a pressurized salt method, a normal pressure dropping method and a pressurized dropping method. Moreover, the reaction temperature is set as low as possible so that yellowing and gelation of polyamide (A) can be suppressed to obtain polyamide (A) with stable characteristics.

A reactive extrusion method is a method in which a polyamide consisting of a diamine component and a dicarboxylic acid component is melt-kneaded in an extruder to react. As to the raw materials used in the reactive extrusion method, the diamine component and the dicarboxylic acid can directly be loaded, or they may be prepared into a polyamide salt or a polyamide oligomer with a number average molecular weight of 2000 or less using a polymerization vessel before being loaded. In order to prevent deterioration of the polyamide, it is preferable to allow the reaction to proceed while removing water with multistage open vents or vacuum vents or the like under a nitrogen atmosphere.

A pressurized salt method is a method in which a nylon salt as a raw material is subjected to melt polycondensation under pressure. Specifically, an aqueous nylon salt solution consisting of a diamine component and a dicarboxylic acid component is prepared, which is subsequently concentrated, placed under pressure to elevate the temperature, and allowed to polycondense while removing the condensation water. The temperature is elevated to about melting point of polyamide (A)+10° C. while gradually restoring the pressure inside the tank to normal pressure, and maintained at that temperature. Furthermore, the pressure is gradually reduced to 0.02 MPaG while maintaining the temperature to continue polycondensation. Once a predetermined agitation torque is reached, pressure is applied inside the tank with nitrogen to about 0.3 MPaG to collect polyamide (A).

The normal pressure dropping method is a method in which a dicarboxylic acid component is melted by heating under normal pressure and a diamine component is continuously dropped for polycondensation while removing the condensation water. This polycondensation reaction is conducted while increasing the temperature of the reaction system so that the reaction temperature does not fall below the melting point of the generated polyamide compound. As compared to the above-described pressurized salt method, the yield per batch resulting from the normal pressure dropping method is higher since this method does not use water for dissolving salt, and the decrease in the reaction rate is smaller and the process time can be shortened since this method does not require vaporization/condensation of the raw material components.

The pressurized dropping method is a method in which, first, a dicarboxylic acid component is fed and melted by heating in a polycondensation tank, and then a diamine component is continuously dropped while applying pressure inside the tank preferably to about 0.3-0.4 MPaG for polycondensation while removing the condensation water. This polycondensation reaction is conducted while increasing the temperature of the reaction system so that the reaction temperature does not fall below the melting point of the generated polyamide compound. Once a preset molar ratio is reached, the diamine component is no longer dropped. The temperature is increased to about melting point of polyamide (A)+10° C. while gradually restoring the pressure inside the tank to normal pressure, and maintained at that temperature. Furthermore, the pressure is gradually reduced to 0.02 MPaG while maintaining the temperature to continue polycondensation. Once a predetermined agitation torque is reached, pressure is applied inside the tank with nitrogen to about 0.3 MPaG to collect a polyamide compound.

Other than judging the end point of the polymerization based on the agitation torque as in the above-described polymerization methods, the melt viscosity, i.e., the number average molecular weight, of polyamide (A) may be adjusted by a method in which the molar ratio is adjusted by shifting from 1 beforehand at the stage of feeding the monomer to set to the intended number average molecular weight. According to the granulating method of the present invention, the terminal amino group concentration of polyamide (A) is 70 µeq/g or lower, and thus the molar ratio needs to be in an excess of carboxyl group. Specifically, molar ratio=(terminal amino group concentration)/(terminal carboxyl group) is less than 1. Thus, in order to prepare a low-molecular polyamide (A) that has a terminal amino group concentration of 70 µeq/g or lower, only by setting the molar ratio corresponding to the intended number average molecular weight, the molar ratio needs to be shifted greatly. In such a case, polymerization time is required to reach the set number average molecular weight, and thus the molar ratio is preferably 0.9400-0.9990, more preferably 0.9450-0.9980, and still more preferably 0.9500-0.9850.

For polycondensation of polyamide (A), a phosphorus atom-containing compound is preferably added from the perspective of promoting amidation reaction.

Examples of the phosphorus atom-containing compound include phosphinic acid compounds such as dimethylphosphinic acid and phenylmethylphosphinic acid; hypophosphorous acid compounds such as hypophosphorous acid, sodium hypophosphite, potassium hypophosphite, lithium hypophosphite, magnesium hypophosphite, calcium hypophosphite and ethyl hypophosphite; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite and pyrophosphorous acid.

Among them, hypophosphite metal salts such as sodium hypophosphite, potassium hypophosphite and lithium hypophosphite are particularly preferably used since they are highly effective in promoting amidation reaction and have an excellent effect of preventing coloring. In particular, sodium hypophosphite is preferable. The phosphorus atom-containing compound that can be used with the present invention is not limited to these compounds.

The added amount of the phosphorus atom-containing compound is preferably 0.1-1000 ppm, more preferably 1-600 ppm, and still more preferably 5-400 ppm in terms of phosphorus atom concentration in the polyamide compound. When it is 0.1 ppm or higher, the polyamide compound is less likely to color during polymerization and thus transparency can be increased. When it is 1000 ppm or lower, the polyamide compound is less likely to gelate, and mixing of fisheyes in the molded product which is considered to be caused by the phosphorus atom-containing compound can be reduced, giving good appearance to the molded product.

Furthermore, an alkali metal compound, in combination with the phosphorus atom-containing compound, is preferably added to the polycondensation system of polyamide (A). In order to prevent coloring of the polyamide compound during polycondensation, the phosphorus atom-containing compound needs to exist for a sufficient amount, which, in some cases, may cause gelation of the polyamide compound. Thus, it is preferable to have an alkali metal compound coexist, also for adjusting the amidation reaction rate.

As the alkali metal compound, an alkali metal hydroxide, an alkali metal acetate, an alkali metal carbonate, an alkali metal alkoxide or the like is preferable. Specific examples of the alkali metal compound that can be used with the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate, but it can be used without being limited to these compounds. From the perspective of controlling the polymerization rate and reducing yellowness, the ratio of the phosphorus atom-containing compound and the alkali metal compound is such that (phosphorus atom-containing compound)/(alkali metal compound) is in a range of preferably 1.0/0.05 to 1.0/1.5, more preferably 1.0/0.1 to 1.0/1.2, and still more preferably 1.0/0.2 to 1.0/1.1.

Polyamide (A) can be melted by heating, for example, in a normal pressure type or an applied pressure type melt polymerization vessel, or a single-screw or a twin-screw extruder.

According to a preferable embodiment of the present invention, polyamide (A) resulting from melt polymerization is preferably continuously used in the molten state in the subsequent step without being solidified. By continuously using it in the molten state in the subsequent step, heat history can be reduced and a molded article with excellent hue can be obtained. If necessary, it is placed in an inert gas atmosphere such as nitrogen in order to prevent deterioration.

Alternatively, polyamide (A) prepared in advance in a melt polymerization vessel, other extruder or the like may be loaded into a single-screw or a twin-screw extruder or a melting tank provided with through-holes or a pastillator such as Rotoformer to melt polyamide (A) by heating. Preferably, the molten polyamide (A) is used in the molten state continuously in the subsequent step. Here, one type or two or more types of polyamide (A) may be used in combination.

According to the method of the present invention, the temperature for melting polyamide (A) by heating is in a range of glass transition temperature+160° C. to glass transition temperature+180° C. As long as the heat-melting temperature is within this range, polyamide (A) is in the molten state, resin burning of polyamide (A) can be suppressed, and polyamide granules with less yellowness can be obtained. Moreover, polyamide (A) in uniform granular forms can be dropped onto the metal belt. The higher the heat-melting temperature is, the lower the melt viscosity of polyamide (A) becomes, where granules with a smaller particle size can be produced. On the other hand, the lower the heat-melting temperature is, the higher the melt viscosity of polyamide (A) becomes, where granules with a relatively large particle size can be produced. The heat-melting temperature may suitably be determined considering the melt viscosity characteristic of polyamide (A) used, particle size of the intended granules, and the like.

Next, the heat-melted polyamide (A) is dropped in granular forms onto a metal belt (Step S2). Dropping may be carried out using a pastillator or the like. As the pastillator, a die having through-holes, or a rotating pastillator such as Rotoformer manufactured by Sandvik, Rolldrop or AccuDrop pastillator manufactured by SBS, Italy, or a hybrid former pastillator manufactured by Nippon Belting can preferably be used.

Polyamide (A) melted by heating in the above-described step is dropped onto a metal belt via the pastillator while being transferred under pressure of nitrogen or the like, or, if the fore device is an extruder, transferred under resin pressure applied by a rotation extruder, and if necessary intermittently or continuously transferred using a feed pump or the like.

When a die with through-holes is used as the pastillator, the shape of the holes is not particularly limited but it preferably has a diameter in a range of 1 mm-10 mm, more preferably 2 mm-7 mm and still more preferably 3 mm-6 mm, to drop the polyamide in granular forms onto the metal belt. The diameter of the through-hole may suitably be determined according to the melt viscosity of polyamide (A) used, particle size of the intended granules and the like. When a rotating pastillator such as Rotoformer is used as the pastillator, the size of Rotoformer is not particularly limited and can suitably be selected according to the actual production capacity.

The metal belt conveys the dropped granular polyamide (A) (or polyamide composition (B)) while cooling. It is preferably a circulating endless metal belt.

The surface of the metal belt preferably has less unevenness, preferably with surface roughness of Ra<0.4 μm. Alternatively, a metal belt that has been subjected to surface processing such as grinding or mirror-finishing may also be used. In a preferable embodiment of the present invention, preferably a mirror-finished metal belt (Ra<0.35 μm), and more preferably a super mirror-finished metal belt (Ra<0.3 μm) is used in view that the dropped polyamide (A) can easily be removed.

Examples of a material of the metal belt include iron, nickel, copper, aluminum and alloys thereof. Among them, a stainless-steel belt is preferable since it has suitable adhesiveness with a polyamide and has excellent cooling efficiency for a granulated polyamide, and a super mirror-finished stainless-steel belt is more preferable.

The length and the width of the metal belt may appropriately be selected according to productivity and cooling efficiency.

Subsequently, polyamide (A) dropped in granular forms onto the metal belt is solidified by cooling (Step S3).

This solidification by cooling may be carried out by natural cooling or air cooling, or cooling water may be sprayed onto the back surface of the metal belt for cooling. Alternatively, cool water at about 5° C. to warm water at about 90° C. may appropriately be poured beneath and around the belt to control the temperature of the belt surface, thereby controlling the adhesiveness and cooling rate of the granules on the belt.

Polyamide (A) solidified by cooling is removed from the metal belt so as to obtain granules of the polyamide.

In the method for granulating a polyamide according to the present invention, polyamide (A) having a terminal amino group concentration of 5 μeq/g to 70 μeq/g is used so as to gain appropriate adhesiveness with the metal belt after heat-melting and dropping onto the metal belt, and so as to easily remove it from the metal belt after solidification by cooling without employing special means such as vacuum suction, thereby enhancing the production rate.

The terminal amino group concentration of polyamide (A) is more preferably 7 μeq/g to 60 μeq/g, and still more preferably 10 μeq/g to 50 μeq/g.

As described above, the method for granulating a polyamide according to the present invention allows granulating of a low-viscosity polyamide. In a preferable aspect of the present invention, granules having a consistent particle size and uniform shape can stably be produced without cobwebbing or the like.

The particle size of the granules obtained according to the method of the present invention can be controlled to lie within an intended range according to the melt viscosity of polyamide (A), the size of through-holes, the dropping rate of polyamide (A) onto the metal belt, the speed of the metal belt and the like. The particle size of the granules may appropriately be determined depending on the intended use, which, for example, is preferably 2 mm-8 mm, more preferably 3 mm-6 mm and still more preferably 3 mm-5 mm. The particle size of the granules can be determined as an average particle diameter by measuring the particle sizes of the randomly taken out granules with a ruler and averaging them. Alternatively, in an online environment, the granules can be photographed with a video camera. In this case, an image analyzing method or the like, in which the number of pixels of each particle on the digitalized images having an identical pixel size is counted to determine the shape index, the aspect ratio or the volume of the particles, can be employed to determine the particle size (average particle diameter) of the granules. In addition, granules having the same size can be collected using a sieve, a granule size sorter or the like such that the granules removed from the metal belt have the intended particle size. Moreover, in order to collect granules containing contaminant such as burning, a color sorter provided with a high-resolution camera, or the like may be used.

2. Method for Granulating Polyamide Composition

Next, a method for granulating a polyamide composition will be described.

A method for granulating a polyamide composition according to the present invention comprises the steps of:

melting polyamide composition (B), which is obtained by mixing polyamide (A) whose melt viscosity at glass transition temperature+160° C. and a shear rate of 100 s$^{-1}$ is 3 Pa·s to 200 Pa·s and whose terminal amino group concentration is 5 μeq/g to 70 μeq/g with at least one of additional resin (C) and additive (D), by heating to a range of glass transition temperature+160° C. to glass transition temperature+180° C.; and dropping the resultant in the molten state in granular forms onto a metal belt for solidification to obtain granules.

Figure 5:
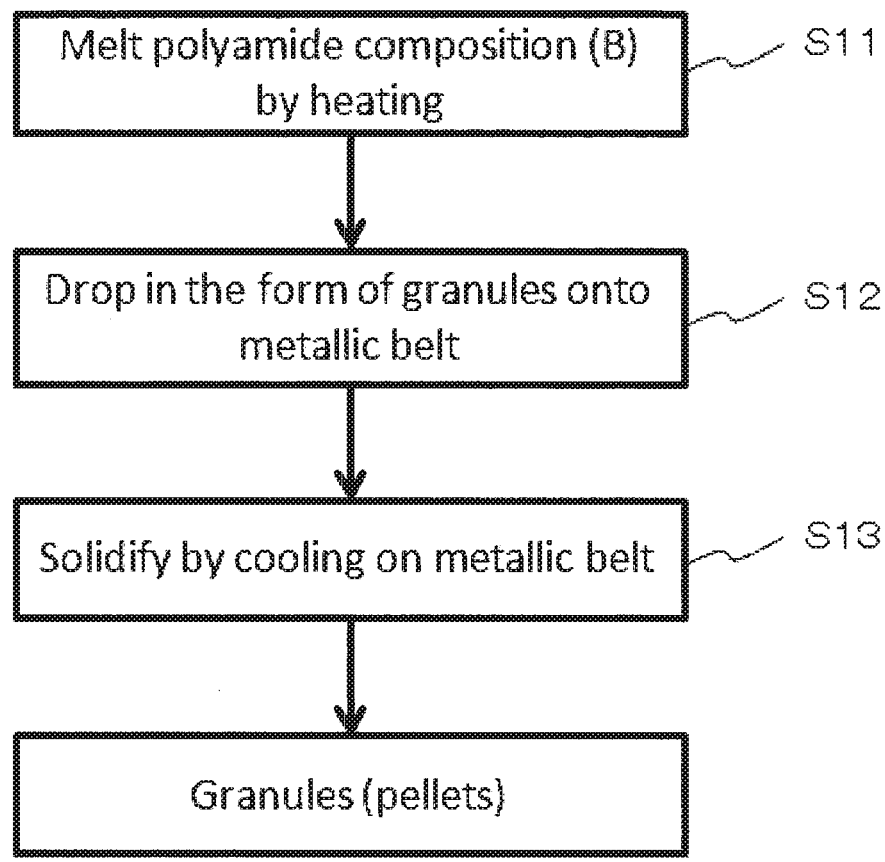
FIG. 5 A flowchart of a method for granulating a polyamide composition according to one embodiment of the present invention.

FIG. 5 is a flowchart of a method for granulating a polyamide composition according to one embodiment of the present invention. As shown in FIG. 5, the method for granulating a polyamide composition according to one embodiment of the present invention comprises a step of melting polyamide composition (B) by heating (S11), a step of dropping the resultant in granular forms onto a metal belt (S12), and a step of solidifying the resultant by cooling on the metal belt (S13).

A device that can be used with the method for granulating a polyamide composition according to one embodiment of the present invention may be, for example, the same device as those described in "1. Method for granulating a polyamide" above. In the heat-melting step, however, a single-screw or a twin-screw extruder shown in FIG. 3 is preferably used, and polyamide composition (B) melted by heating is preferably dropped in granular forms onto a metal belt by using through-holes in the extruder or a pastillator such as Rotoformer. Alternatively, a polyamide composition melted by heating and kneaded in advance in a melting tank, an extruder or the like may be dropped in granular forms onto a metal belt by using a roller-drop type pastillator shown in FIG. 4 or the like. If necessary, a gear pump, a filter or the like is preferably provided before the extruder.

In one preferable embodiment of the present invention, the fore device of the metal belt includes a single-screw or a twin-screw extruder, where at least one of additional resin (C) and additive (D) is melt-blended with polyamide (A), and the resulting mixture in the molten state is continuously dropped in granular forms onto the metal belt for solidification to obtain granules. After melt-blending polyamide (A), at least one of additional resin (C) and additive (D), the resulting mixture in the molten state is continuously dropped in granular forms onto a metal belt without being solidified, so that the heat history of the mixture can be reduced and a molded article with excellent hue can be obtained.

Hereinafter, each step of the method for granulating a polyamide composition according to one embodiment of the present invention will be described specifically. Since Steps S12 and S13 are the same as Steps S2 and S3 in the method for granulating a polyamide except that polyamide composition (B) is used instead of polyamide (A), Step S11 will be described.

In the method for granulating a polyamide composition according to the present invention, polyamide composition (B) is melted by heating (Step S11).

Polyamide composition (B) is obtained by mixing at least one of additional resin (C) and additive (D) to polyamide (A) having melt viscosity of 3 Pa·s to 200 Pa·s at glass transition temperature+160° C. and a shear rate of 100 s$^{-1}$, and a terminal amino group concentration of 5 μeq/g to 70 μeq/g.

Polyamide (A) used may be the same as one described in the method for granulating a polyamide. Here, one type or two or more types of polyamide (A) may be used in combination.

Additional resin (C) blended with polyamide (A) of the present invention is not particularly limited as long as it does not hinder the purpose and the action effect of the present invention.

Examples of additional resin (C) include, but not limited to, polyolefin, polyester, a hydrogenated product of a styrene-butadiene copolymer resin, an ionomer, an ethylene-ethyl acrylate copolymer resin, a modified product of maleic anhydride of an ethylene-ethyl acrylate copolymer resin, an ethylene-methacrylic acid copolymer resin, polyamide elastomers such as nylon 12 elastomer, an ethylene-propylene copolymerization elastomer and a polyester elastomer. These resins have effects of improving impact resistance of a polyamide, and pinhole resistance and flexibility of a film, and thus are favorable.

The number average molecular weight of additional resin (C) is not limited as long as it is within a range that does not affect the granulation property, and it is preferably 3000-50000, more preferably 5000-40000, and still more preferably 7000-30000, although it depends on the blended amount of additional resin (C).

For the purpose of imparting other function or effect to polyamide (A), additional resin (C) can suitably be added according to the effect or the granulation property thereof. The blended amount of additional resin (C) is preferably, 0.5-30% by mass, more preferably 1-20% by mass, and particularly preferably 1-10% by mass in polyamide composition (B)

Examples of additive (D) include, but not limited to, a lubricant, a crystallization nucleating agent, a whitening-preventing agent, a matting agent, a heat-resistant stabilizer, a weather-resistant stabilizer, an ultraviolet absorber, a plasticizer, a flame retardant, an antistatic agent, a coloring-preventing agent, an antioxidant, an impact resistance improving agent, and an anti-gelling/fisheye reducing agent. These additives (D) may be added, if necessary, within a range that does not hinder the purpose and the action effect of the present invention.

Additive (D) may be any additive as long as it is generally used in a polyamide composition. For example, as the whitening-preventing agent, a diamide compound, a diester compound or the like can be used. These may be used alone or may be used in combination.

As the diamide compound, a diamide compound obtained from aliphatic dicarboxylic acid having a carbon number of 8-30 and diamine having a carbon number of 2-10 is preferable. Aliphatic dicarboxylic acid having a carbon number of 8 or more and diamine having a carbon number of 2 or more can be expected to prevent whitening. Meanwhile, aliphatic dicarboxylic acid having a carbon number of 30 or less and diamine having a carbon number of 10 or less can result good uniform dispersion in the resin composition. Aliphatic dicarboxylic acid may have a side chain or a double bond, but it is preferably linear saturated aliphatic dicarboxylic acid. One type or two or more types of diamide compounds may be used in combination.

Examples of aliphatic dicarboxylic acid include stearic acid (C18), eicosanoic acid (C20), behenic acid (C22), montanic acid (C28) and triacontanoic acid (C30). Examples of the above-described diamine include ethylene diamine, butylene diamine, hexanediamine, xylylene diamine and bis(aminomethyl)cyclohexane. A diamide compound obtained by combining them is preferable.

A diamide compound obtained from aliphatic dicarboxylic acid having a carbon number of 8-30 and diamine primarily consisting of ethylene diamine, or a diamide compound obtained from aliphatic dicarboxylic acid primarily consisting of montanic acid and diamine having a carbon number of 2-10 are preferable, and a diamide compound obtained from aliphatic dicarboxylic acid primarily consisting of stearic acid and diamine primarily consisting of ethylene diamine is particularly preferable.

As a diester compound, a diester compound obtained from aliphatic dicarboxylic acid having a carbon number of 8-30 and diol having a carbon number of 2-10 is preferable. Aliphatic dicarboxylic acid having a carbon number of 8 or more and diamine having a carbon number of 2 or more can be expected to prevent whitening. Meanwhile, aliphatic dicarboxylic acid having a carbon number of 30 or less and diol having a carbon number of 10 or less can result good uniform dispersion in the resin composition. Aliphatic dicarboxylic acid may have a side chain or a double bond, but it is preferably linear saturated aliphatic dicarboxylic acid. One type or two or more types of diester compounds may be used in combination.

Examples of aliphatic dicarboxylic acid include stearic acid (C18), eicosanoic acid (C20), behenic acid (C22), montanic acid (C28) and triacontanoic acid (C30). Examples of the diol component of the diester compound include ethylene glycol, propanediol, butanediol, hexanediol, xylylene glycol and cyclohexane dimethanol. The diester compound is preferably obtained by combining them.

A diester compound obtained from aliphatic dicarboxylic acid primarily consisting of montanic acid and diol primarily consisting of ethylene glycol and/or 1,3-butanediol is particularly preferable.

The added amount of the diamide compound and/or the diester compound is 0.005-0.5 parts by mass, preferably 0.05-0.5 parts by mass and particularly preferably 0.12-0.5 parts by mass with respect to 100 parts by mass of polyamide (A).

As an inorganic crystallization nucleating agent, those that are usually used for a thermoplastic resin can be used, for example, a glass filler (glass fiber, crushed glass fiber (milled fiber), glass flake, glass beads, etc.), calcium silicate-based filler (wollastonite, etc.), mica, talc (powdered talc, granular talc using rosin as a binder, etc.), kaoline, potassium titanate whisker, boron nitride, clay such as laminar silicate, nano filler or carbon fiber, where two or more types of them may be used in combination. Preferably, the maximum diameter of an inorganic crystallization nucleating agent is 0.01-5 μm. In particular, powdered talc with a particle size of 3.0 μm or less is preferable, powdered talc with a particle size of about 1.5-3.0 μm is more preferable, and powdered talc with a particle size of 2.0 μm or less is particularly preferable. Moreover, granular talc using rosin as a binder in addition to this powdered talc is particularly preferable since it will have good dispersion state in the polyamide composition. As an organic crystallization nucleating agent, a micro-level to nano-level size bimolecular film capsule containing a crystallization nucleating agent, a bis(benzylidene)sorbitol-based or phosphorous-based transparentizing crystallization nucleating agent, a rosin amide-based gelling agent, or the like are preferable, and a bis(benzylidene)sorbitol-based crystallization nucleating agent is particularly preferable.

The added amount of the crystallization nucleating agent is preferably 0.005-2.0 parts by mass, and particularly preferably 0.01-1.5 parts by mass with respect to 100 parts by mass of polyamide (A).

Examples of the anti-gelling agent/fisheye reducing agent include one or more types of carboxylates selected from sodium acetate, calcium acetate, magnesium acetate, calcium stearate, magnesium stearate, sodium stearate and derivatives thereof. Here, examples of such derivatives include 12-hydroxystearic acid metal salts such as 12-calcium hydroxystearate, 12-magnesium hydroxystearate and 12-sodium hydroxystearate. Addition of carboxylates can prevent gelation in the polyamide composition during molding processing and can reduce fisheyes in the compact, thereby enhancing the aptitude of the molding processing.

The added amount of the carboxylate is preferably 400-10000 ppm, more preferably 800-5000 ppm, and still more preferably 1000-3000 ppm as a concentration in the polyamide composition. When it is 400 ppm or higher, heat deterioration of polyamide (A) can be suppressed and gelation can be prevented. When it is 10000 ppm or less, polyamide composition (B) does not result a molding failure and also no coloring or whitening is caused. When the carboxylate, i.e., a basic substance, is present in the molten polyamide compound, denaturation of polyamide (A) due to heat is delayed, and generation of gel that is considered to be the resulting denatured material is expected to be suppressed.

The above-described carboxylates are excellent in handling. Among them, stearic acid metal salt is favorable since it is inexpensive, it has an effect as a lubricant, and it can further stabilize the molding processing. Furthermore, although the shape of the carboxylate is not particularly limited, it is easy to uniformly disperse upon dry mixing with the polyamide composition when the carboxylate is in a powder form with a small particle size. Therefore, the particle size is preferably 0.2 mm or less.

Examples of the antioxidant include a copper-based antioxidant, a hindered phenol-based antioxidant, a hindered amine-based antioxidant, a phosphorous-based antioxidant and a thio-based antioxidant. Among them, a hindered phenol-based antioxidant and a phosphorous-based antioxidant are preferable.

Specific examples of the hindered phenol-based antioxidant include triethylene glycol-bis[3-(3-t-butyl-5-methyl-4-hydroxyphenyl)propionate, 4,4'-butylidene bis(3-methyl-6-t-butylphenol), 1,6-hexanediol-bis[3-(3,5-di-t-butyl-4-hydroxyphenyl)propionate, 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, 2,2-thiobis(4-methyl-6-1-butylphenol), N,N'-hexamethylene bis(3,5-di-t-butyl-4-hydroxy-hydrocinnamide), 3,5-di-t-butyl-4-hydroxy-benzyl phosphonate-diethyl ester, 1,3,5-trimethyl-2,4,6-tris(3,5-di-butyl-4-hydroxybenzyl)benzene, bis(3,5-di-t-butyl-4-ethyl calcium hydroxybenzylsulphonate, tris-(3,5-di-t-butyl-4-hydroxybenzyl)-isocyanate, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene bis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-O-cresol, isooctyl-3-(3,5-di-t-butyl-4-hydroxyphenyl)propionate, 4,4'-butylidene bis(3-methyl-6-t-butylphenol, 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-T-butylphenyl)butyric acid]glycol ester, 1,3,5-tris(3',5'-di-t-butyl-4'-hydroxybenzyl)-sec-triazine-2,4,6-(1H,3H,5H) trione and d-α-tocopherol. These may be used alone or as a mixture thereof. Specific examples of commercially available products of a hindered phenol compound include Irganox1010 and Irganox1098 manufactured by BASF (both of them are trade names).

Specific examples of a phosphorous-based antioxidant include organic phosphorous compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris(2,4-di-tert-butylphenyl) phosphite, distearylpentaerythritol diphosphite, tetra(tridecyl-4,4'-isopropylidene diphenyldiphosphite and 2,2-methylene bis(4,6-di-tert-butylphenyl) octyl phosphite. These may be used alone or as a mixture thereof.

From the perspective of controlling oxygen absorption performance and suppressing deterioration of mechanical properties, a blended amount of the antioxidant in polyamide composition (B) is preferably 0.001-3 parts by mass and more preferably 0.01-1 parts by mass with respect to 100 parts by mass of polyamide (A).

The blended amount of polyamide (A) in polyamide composition (B) is preferably 70% by mass or more, more preferably 80% by mass or more, and still more preferably 90% by mass or more. Within this range, granule moldability will not be impaired by the optional components other than polyamide (A). Here, in polyamide composition (B), polyamide (A) may react with additional resin (C) or additive (B).

Polyamide composition (B) is melted by heating, for example, by using a single-screw or a twin-screw extruder or the like. Preferably, polyamide composition (B) in the molten state is directly and continuously used in the next step.

As the method for introducing polyamide composition (B) into the extruder, polyamide composition (B) may be mixed homogeneously using a tumbler, a Henschel mixer, a super mixer or the like in advance before being introduced into the extruder, or components in the molten state that are to be melt-kneaded may separately be introduced using a side compactor or other extruder.

The heat-melting temperature of polyamide composition (B) is in a range of (glass transition temperature+160° C.) to (glass transition temperature+180° C.). Within this range, resin burning of polyamide composition (B) can be suppressed, and granules of the polyamide composition can be obtained with less yellowness. Moreover, polyamide composition (B) can be dropped in uniform granular forms onto the metal belt. The higher the heat-melting temperature is, the lower the melt viscosity of polyamide composition (B) becomes, where granules with a smaller particle size can be produced. On the other hand, the lower the heat-melting temperature is, the higher the melt viscosity of polyamide composition (B) becomes, where granules with a relatively large particle size can be produced. The heat-melting temperature may appropriately be determined considering the melt viscosity characteristics of polyamide (A) or polyamide composition (B) used, and particle size or the like of the intended granules.

Similar to the method for granulating a polyamide of the present invention, polyamide composition (B) melted by heating is dropped in granular forms onto a metal belt through a die having through-holes, Rotoformer, a roller-drop type pastillator or the like to be solidified by cooling on the metal belt to obtain granules.

The particle size of the granules obtained by the method of the present invention can be controlled to lie in an intended range according to melt viscosity of polyamide (A) or polyamide composition (B), size of the through-holes, dropping rate of polyamide composition (B) onto the metal belt, speed of the metal belt, and the like. The particle size of the granules may suitably be determined depending on the intended use. For example, it is preferably 2 mm-8 mm, more preferably 3 mm-6 mm, and still more preferably 3 mm-5 mm. The particle size of the granules can be measured according to the method described in "1. Method for granulating a polyamide" above.

As described above, according to the method for granulating a polyamide composition of the present invention, a polyamide composition containing low-viscosity polyamide (A) can be granulated. In a preferable aspect of the present invention, granules having consistent particle size and less variation in the shape can be produced.

Granules (pellets) obtained by the granulating method of the present invention can favorably be used as a molded material such as various packaging materials, packaging containers or the like. For example, the granules of the present invention can be used for molding at least part of a films-like or sheets-like packaging material, or at least part of a packaging container such as a bottle, a tray, a cup, a tube, a flat bag or a pouch, e.g., a standing pouch. In particular, it can favorably be used for a PET/MX nylon-blend bottle which requires the granules to have a low molecular weight.

Packaging materials and packaging containers obtained by using the granules of the present invention are favorable for housing and storing a variety of articles. For example, they can house or store a variety of articles such as beverages, seasonings, grains, liquid and solid processed food products that requires sterile filling or heat sterilization, chemical agents, liquid daily products, pharmaceutical products, semiconductor integrated circuits and electronic devices.

In addition, the granules of the present invention are also favorable for usage as paint, coating and the like. The granules of the present invention can be used to form a uniform coating film.

EXAMPLES

Hereinafter, the present invention will be described more specifically by way of examples, although the present invention should not be limited to these examples.

In the following example, units consisting polyamide (A) are sometimes referred to as the following abbreviations.

"MXDA": Unit derived from metaxylylene diamine
"PXDA": Unit derived from paraxylylene diamine
"1,3-BAC": Unit derived from 1,3-bisaminocyclohexane
"1,4-BAC": Unit derived from 1,4-bisaminocyclohexane
"AA": Unit derived from adipic acid
"SA": Unit derived from sebacic acid
"IPA": Unit derived from isophthalic acid Furthermore, the respective properties of polyamide (A) obtained in the following production example, examples and comparative examples were measured by method shown below.

(1) Terminal Amino Group Concentration and Number Average Molecular Weight

A terminal amino group concentration and a terminal carboxyl group concentration of polyamide (A) were measured by the following method.

(a) Terminal Amino Group Concentration ([NH$_2$] µEq/g)

0.5 g of polyamide (A) was accurately weighed, and dissolved in 30 mL of a mixed solution of phenol/ethanol=4/1 (volume ratio) at 20-30° C. while agitating. Once polyamide (A) was completely dissolved, the inner wall of the container was washed with 5 mL of methanol while agitating the resulting solution. Then, neutralization titration was performed using a 0.01 mol/L aqueous hydrochloric acid solution to calculate the terminal amino group concentration [NH$_2$] (µeq/g).

(b) Terminal Carboxyl Group Concentration ([COOH] (µeq/g)

0.5 g of polyamide (A) was accurately weighed, and dissolved in 30 mL of benzyl alcohol in a nitrogen gas flow at 160° C.-180° C. while agitating the polyamide. Once polyamide (A) was completely dissolved, the resulting solution was cooled in a nitrogen gas flow to 80° C., and added with 10 mL of methanol while agitating. Then, neutralization titration was performed using a N/100 aqueous hydroxide sodium solution to calculate the terminal carboxyl group concentration [COOH] (µeq/g).

Subsequently, the number average molecular weight of polyamide (A) was determined by the following formulation based on the determined values of the terminal amino group concentration and the terminal carboxyl group concentration.

Number average molecular weight=2×1,000,000/([NH$_2$]+[COOH])

[NH$_2$]: Terminal amino group concentration (µeq/g)
[COOH]: Terminal carboxyl group concentration (µeq/g)

(2) Glass Transition Temperature (Tg) and Melting Point (Tm)

A differential scanning calorimeter (manufactured by Shimadzu Corporation, product name "DSC-60") was used, in which temperature of polyamide (A) was elevated to 10° C.-260° C. at a temperature elevation rate of 10° C./min in a nitrogen gas flow, rapidly cooled with dry ice, and again elevated to 10° C.-260° C. at a temperature elevation rate of 10° C./min in a nitrogen gas flow. Once the temperature reached 260° C., the resultant was stored for 5 minutes, and the temperature was lowered to 120° C. at −5° C./min, thereby obtaining a sample. The obtained sample was used to perform DSC measurement (differential scanning calorimetry) to determine the glass transition temperature (Tg) and the melting point (Tm) of polyamide (A).

(3) Melt Viscosity

A capillograph (manufactured by Toyo Seiki Seisaku-sho, product name "Capillograph 1D"), a 1 mmφ×10 mmH die, and polyamide (A) with a moisture content adjusted to about 500 ppm were used to measure the melt viscosity (Pa·s) at a shear rate of 100 s$^{-1}$. The temperature of measurement was set to glass transition temperature+160° C., while the fall-rate of piston was set to 10 mm/min.

Polyamide (A) used was dried at 140° C. for 5 hours in a vacuum drier to have a moisture content of 500 ppm±50 ppm.

(4) Yellowness

A color difference meter (manufactured by Nippon Denshoku Industries, product name "Color meter 2000") was used to measure the yellowness (YI) of the obtained granules.

(5) Particle Size

Ten particles were randomly picked from the obtained granules to measure their diameters diagonally using a ruler and an average value thereof was used as the particle size.

Example 1

Accurately weighed 13000 g (88.95 mol) of adipic acid, 11.29 g (0.11 mol) of sodium hypophosphite and 5.85 g (0.07 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 11077 g (86.45 mol) of metaxylylene diamine (feed molar ratio of diamine component/dicarboxylic acid component (MXDA/AA)=0.9720) stored in the drop tank was dropped into the molten raw material in the melt polymerization vessel, the pressure inside the melt polymerization vessel was kept at 0.4 MPaG, and the temperature inside the melt polymerization vessel was continuously elevated to 260° C. while removing the generated condensation water outside the system.

At the end of dropping metaxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a MXDA/AA copolymer "Polyamide No. 1".

While the obtained "Polyamide No. 1" was intermittently transferred at glass transition temperature+160° C. or 170° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. The granule moldability at this point was judged based on the following evaluation indexes. The results are shown in Table 1.

[Evaluation Indexes of Granule Moldability]

A: Particles having consistent particle size and uniform shape can be produced without cobwebbing and favorably granulated.

B: Granulating is possible but there is some amount of variation in shapes.

C: Due to high viscosity, dropping onto belt is difficult and thus granulating is impossible. In addition, cobwebbing is terrible even under different conditions.

D: Due to low viscosity, dropping onto belt does not result granular forms and thus granulating is impossible.

E: Dropped resin adheres to belt and cannot be removed from belt after cooling.

Example 2

Other than the feed molar ratio of diamine component/dicarboxylic acid component (MXDA/AA) was 0.9619 to obtain "Polyamide No. 2", granulating was carried out in the same manner as Example 1. The results are shown in Table 1.

Example 3

Other than the feed molar ratio of diamine component/dicarboxylic acid component (MXDA/AA) was 0.9537 to obtain "Polyamide No. 3", granulating was carried out in the same manner as Example 1. The results are shown in Table 1.

Example 4

Other than the feed molar ratio of diamine component/dicarboxylic acid component (MXDA/AA) was 0.9620 to obtain "Polyamide No. 4", granulating was carried out in the same manner as Example 1. The results are shown in Table 1.

Example 5

Other than the feed molar ratio of diamine component/dicarboxylic acid component (MXDA/AA) was 0.9685 to obtain "Polyamide No. 5", granulating was carried out in the same manner as Example 1. The results are shown in Table 1.

Example 6

Accurately weighed 12120 g (82.94 mol) of adipic acid, 880 g (5.29 mol) of high-purity isophthalic acid, 10.96 g (0.10 mol) of sodium hypophosphite and 5.68 g (0.07 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 11520 g (84.59 mol) of metaxylylene diamine (feed molar ratio of diamine component/dicarboxylic acid component (MXDA/(AA+IPA)= 0.9587) stored in the drop tank was dropped into the molten raw material in the melt polymerization vessel, the pressure inside the melt polymerization vessel was kept at 0.4 MPaG, and the temperature inside the melt polymerization vessel was continuously elevated to 260° C. while removing the generated condensation water outside the system.

At the end of dropping metaxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a MXDA/(AA+IPA) copolymer "Polyamide No. 6".

While the obtained "Polyamide No. 6" was intermittently transferred at 260° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 1.

Example 7

Accurately weighed 13000 g (64.28 mol) of sebacic acid, 9.97 g (0.09 mol) of sodium hypophosphite and 5.17 g (0.06 mol) of sodium acetate were put into a pressure-proof melt polymerization vessel having an internal volume of 50 L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 8740 g (64.15 mol) of metaxylylene diamine (feed molar ratio of diamine component/dicarboxylic acid component (MXDA/SA)=0.9980) stored in the drop tank was dropped into the molten raw material in the melt polymerization vessel, the pressure inside the melt polymerization vessel was kept at 0.4 MPaG, and the temperature inside the melt polymerization vessel was continuously elevated to 240° C. while removing the generated condensation water outside the system.

At the end of dropping metaxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a MXDA/SA copolymer "Polyamide No. 7".

While the obtained "Polyamide No. 7" was intermittently transferred at 260° C. using a feed pump, it was intermittently dropped from a dropping port having 10 holes that are 3 mm in diameter of Rotoformer (manufactured by Sandvik) having a diameter of 5 m onto a stainless-steel belt having a width of 600 mm and a length of 6 m, to be solidified by cooling on the stainless-steel belt for granulation. Similar to Example 1, the granule moldability at this point was judged based on the evaluation indexes. The results are shown in Table 1.

Example 8

Accurately weighed 13000 g (64.28 mol) of sebacic acid, 9.97 g (0.09 mol) of sodium hypophosphite and 5.17 g (0.06 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 8740 g (64.15 mol) of paraxylylene diamine (feed molar ratio of diamine component/dicarboxylic acid component (PXDA/SA)=0.9980) stored in the drop tank and kept at 80° C. was dropped into the molten raw material in the melt polymerization vessel, the pressure inside the melt polymerization vessel was kept at 0.4 MPaG, and the temperature inside the melt polymerization vessel was continuously elevated to 290° C. while removing the generated condensation water outside the system.

At the end of dropping the paraxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a PXDA/SA copolymer "Polyamide No. 8".

While the obtained "Polyamide No. 8" was intermittently transferred at 260° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 1.

Example 9

Accurately weighed 13000 g (64.28 mol) of adipic acid, 9.96 g (0.09 mol) of sodium hypophosphite and 5.16 g (0.06 mol) of sodium acetate were put into a pressure-proof melt polymerization vessel having an internal volume of 5OL and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 12650 g (85.97 mol) of 1,3-bisaminocyclohexane (cis/trans (mol % ratio)=70/30) (feed molar ratio of diamine component/dicarboxylic acid component (1,3-BAC/AA)=0.9665) stored in the drop tank was dropped into the molten raw material in the melt polymerization vessel, the pressure inside the melt polymerization vessel was kept at 0.4 MPaG, and the temperature inside the melt polymerization vessel was continuously elevated to 290° C. while removing the generated condensation water outside the system.

At the end of dropping 1,3-bisaminocyclohexane, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a 1,3-BAC/AA copolymer "Polyamide No. 9".

While the obtained "Polyamide No. 9" was intermittently transferred at 260° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 1.

Example 10

Accurately weighed 13000 g (64.28 mol) of sebacic acid, 9.94 g (0.09 mol) of sodium hypophosphite and 5.13 g (0.06 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die.

After sufficient nitrogen substitution, the melt polymerization vessel was sealed to keep the pressure inside the melt polymerization vessel to 0.4 MPaG and elevate the temperature to 170° C. while agitating.

Once 170° C. was reached, 8600 g (61.36 mol) of 1,4-bisaminocyclohexane (cis/trans (mol % ratio)=20/80) (feed molar ratio of diamine component/dicarboxylic acid component (1,4-BAC/AA)=0.9546) stored in the drop tank was dropped into the molten raw material in the melt polymerization vessel, the pressure inside the melt polymerization vessel was kept at 0.4 MPaG, and the temperature inside the melt polymerization vessel was continuously elevated to 290° C. while removing the generated condensation water outside the system.

At the end of dropping 1,4-bisaminocyclohexane, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a 1,4-BAC/SA copolymer "Polyamide No. 10".

While the obtained "Polyamide No. 10" was intermittently transferred at 290° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 1.

Comparative Example 1

Other than the feed molar ratio of diamine component/dicarboxylic acid component (MXDA/AA) was 0.9929 to obtain "Polyamide No. 11", granulating was carried out in the same manner as Example 1. The results are shown in Table 2.

Comparative Example 2

Other than the feed molar ratio of diamine component/dicarboxylic acid component (MXDA/AA) was 0.9946 to obtain "Polyamide No. 12", granulating was carried out in the same manner as Example 1. The results are shown in Table 2.

Comparative Example 3

Other than the feed molar ratio of diamine component/dicarboxylic acid component (MXDA/AA) was 0.9847 to obtain "Polyamide No. 13", granulating was carried out in the same manner as Example 1. The results are shown in Table 2.

Comparative Example 4

Other than the feed molar ratio of diamine component/dicarboxylic acid component (MXDA/AA) was 0.9663 to obtain "Polyamide No. 14", granulating was carried out in the same manner as Example 1. The results are shown in Table 2.

Comparative Example 5

Other than the feed molar ratio of diamine component/dicarboxylic acid component (MXDA/AA) was 0.9663 to obtain "Polyamide No. 15", granulating was carried out in the same manner as Example 1. The results are shown in Table 2.

Comparative Example 6

Accurately weighed 13000 g (64.28 mol) of sebacic acid, 9.95 g (0.09 mol) of sodium hypophosphite and 5.16 g (0.06 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 8700 g (63.85 mol) of metaxylylene diamine (feed molar ratio of diamine component/dicarboxylic acid component (MXDA/SA)=0.9980) stored in the drop tank was dropped into the molten raw material in the melt polymerization vessel, the pressure inside the melt polymerization vessel was kept at 0.4 MPaG, and the temperature inside the melt polymerization vessel was continuously elevated to 260° C. while removing the generated condensation water outside the system.

At the end of dropping metaxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a MXDA/SA copolymer (MXDA/SA) "Polyamide No. 16".

While the obtained "Polyamide No. 16" was intermittently transferred 240° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 2.

Comparative Example 7

Accurately weighed 12120 g (82.94 mol) of adipic acid, 880 g (5.29 mol) of high-purity isophthalic acid, 11.15 g (0.11 mol) of sodium hypophosphite and 5.78 g (0.07 mol) of sodium acetate were put into a pressure-proof melt polymerization vessel having an internal volume of 50L and equipped with an agitator, a partial condenser, a total condenser, a pressure regulator, a thermometer, a drop tank, a pump, an aspirator, a nitrogen introducing pipe, a bottom discharge valve and a strand die. After sufficient nitrogen substitution, the melt polymerization vessel was sealed to keep the pressure inside the melt polymerization vessel to 0.4 MPaG and elevate the temperature to 170° C. while agitating.

Once 170° C. was reached, 11890 g (87.33 mol) of metaxylylene diamine (feed molar ratio of diamine component/dicarboxylic acid component (MXDA/(AA+IPA)= 0.9898) stored in the drop tank was dropped into the molten raw material in the melt polymerization vessel, the pressure inside the melt polymerization vessel was kept at 0.4 MPaG, and the temperature inside the melt polymerization vessel was continuously elevated to 260° C. while removing the generated condensation water outside the system.

At the end of dropping metaxylylene diamine, the pressure inside the melt polymerization vessel was gradually restored to normal pressure, and then the pressure inside the melt polymerization vessel was reduced to 80 kPaG using the aspirator to remove the condensation water. The agitation torque of the agitator was observed during the pressure reduction to stop the agitation at a point where a predetermined torque was reached. The pressure was applied inside the melt polymerization vessel with nitrogen. The bottom discharge valve was opened to obtain a MXDA/(AA+IPA) copolymer "Polyamide No. 17".

While the obtained "Polyamide No. 17" was intermittently transferred 260° C. using a feed pump, it was intermittently dropped from Rotoformer (manufactured by Sandvik) having a diameter of 5 m onto a stainless-steel belt having a width of 600 mm and a length of 6 m, to be solidified by natural cooling on the stainless-steel belt for granulation. Similar to Example 1, the granule moldability at this point was judged based on the evaluation indexes. The results are shown in Table 2.

TABLE 1

| | | | Unit | Example 1 | Example 2 | Example 3 | Example 4 | Example 5 |
|---|---|---|---|---|---|---|---|---|
| | | Polyamide No. | | 1 | 2 | 3 | 4 | 5 |
| Monomer | Aromatic diamine | Metaxylylene diamine | mol % | 100 | 100 | 100 | 100 | 100 |
| | | Paraxylylene diamine | mol % | | | | | |
| | Alicyclic diamine | 1,3-bisaminocyclohexane | mol % | | | | | |
| | | 1,4-bisaminocyclohexane | mol % | | | | | |
| | Aliphatic dicarboxylic acid | Adipic acid | mol % | 100 | 100 | 100 | 100 | 100 |
| | | Sebacic acid | mol % | | | | | |
| | Aromatic dicarboxylic acid | Isophthalic acid | mol % | | | | | |
| Characteristics | Terminal group concentration | Amino group concentration | μeq/g | 17 | 14 | 14 | 32 | 63 |
| | | Carboxyl group concentration | μeq/g | 247 | 328 | 397 | 345 | 322 |
| | | Number average molecular weight | — | 7580 | 5860 | 4870 | 5310 | 4902 |
| | Thermal property | Glass transition temperature | ° C. | 87 | 87 | 87 | 87 | 87 |
| | | Melting point | ° C. | 237 | 237 | 237 | 237 | 237 |
| | Melt viscosity (100⁻¹) | Glass transition temperature + 160° C. | Pa · s | 36 | 8 | 6 | 7 | 6 |
| | | Glass transition temperature + 170° C. | Pa · s | 21 | N.D. | N.D. | N.D. | N.D. |
| Granule moldability | Molding temperature | Glass transition temperature + 160° C. | — | B | B | B | B | B |
| | | Glass transition temperature + 17° C. | — | B | A | A | A | B |
| Granule evaluation | Average particle size (mm) | — | — | 4 | 3 | 3 | 3 | 3 |
| | Yellowness (YI) | — | — | 4 | 6 | 6 | 5 | 4 |

| | | | Unit | Example 6 | Example 7 | Example 8 | Example 9 | Example 10 |
|---|---|---|---|---|---|---|---|---|
| | | Polyamide No. | | 6 | 7 | 8 | 9 | 10 |
| Monomer | Aromatic diamine | Metaxylylene diamine | mol % | 100 | 100 | | | |
| | | Paraxylylene diamine | mol % | | | 100 | | |
| | Alicyclic diamine | 1,3-bisaminocyclohexane | mol % | | | | 100 | |
| | | 1,4-bisaminocyclohexane | mol % | | | | | 100 |

TABLE 1-continued

| | | | | | | | | |
|---|---|---|---|---|---|---|---|---|
| | Aliphatic dicarboxylic acid | Adipic acid | mol % | 94 | | | 100 | |
| | | Sebacic acid | mol % | | 100 | 100 | | 100 |
| | Aromatic dicarboxylic acid | Isophthalic acid | mol % | 6 | | | | |
| Characteristics | Terminal group concentration | Amino group concentration | µeq/g | 15 | 20 | 21 | 18 | 19 |
| | | Carboxyl group concentration | µeq/g | 354 | 243 | 256 | 289 | 320 |
| | | Number average molecular weight | — | 5420 | 7610 | 7220 | 6520 | 5900 |
| | Thermal property | Glass transition temperature | °C. | 92 | 60 | 74 | 103 | 93 |
| | | Melting point | °C. | 229 | 190 | 290/281 | 232 | 270 |
| | Melt viscosity (100$^{-1}$) | Glass transition temperature + 160° C. | Pa · s | 6 | 41 | 52 | 14 | 6 |
| | | Glass transition temperature + 170° C. | Pa · s | N.D. | 25 | 33 | 6 | N.D. |
| Granule moldability | Molding temperature | Glass transition temperature + 160° C. | — | B | B | B | B | B |
| | | Glass transition temperature + 17° C. | — | A | B | B | B | A |
| Granule evaluation | Average particle size (mm) | — | — | 3 | 4 | 4 | 4 | 3 |
| | Yellowness (YI) | — | — | 5 | 4 | 3 | 3 | 3 |

*N.D.: Not Detected

TABLE 2

| | | | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| | Polyamide No. | | | 11 | 12 | 13 | 14 | 15 | 16 | 17 |
| Monomer | Aromatic diamine | Metaxylylene diamine | mol % | 100 | 100 | 100 | 100 | 100 | 100 | 100 |
| | | Paraxylylene diamine | mol % | | | | | | | |
| | Alicyclic diamine | 1,3-bisaminocyclohexane | mol % | | | | | | | |
| | | 1,4-bisaminocyclohexane | mol % | | | | | | | |
| | Aliphatic dicarboxylic acid | Adipic acid | mol % | 100 | 100 | 100 | 100 | 100 | | 94 |
| | | Sebacic acid | mol % | | | | | | 100 | |
| | Aromatic dicarboxylic acid | Isophthalic acid | mol % | | | | | | | 6 |
| Characteristics | Terminal group concentration | Amino group concentration | µeq/g | 36 | 19 | 551 | 71 | 381 | 42 | 35 |
| | | Carboxyl group concentration | µeq/g | 93 | 63 | 675 | 348 | 15 | 86 | 88 |
| | | Number average molecular weight | — | 15500 | 24390 | 1630 | 4750 | 5060 | 15630 | 16260 |
| | Thermal property | Glass transition temperature | °C. | 87 | 87 | N.D. | 87 | 87 | 60 | 92 |
| | | Melting point | °C. | 237 | 237 | N.D. | 237 | 237 | 190 | 229 |
| | Melt viscosity (100$^{-1}$) | Glass transition temperature + 160° C. | Pa · s | 476 | 890 | N.D. | 6 | 7 | 780 | 1250 |
| | | Glass transition temperature + 170° C. | Pa · s | 295 | 751 | N.D. | N.D. | N.D. | 510 | 960 |
| | | Glass transition temperature + 180° C. | Pa · s | 210 | 531 | — | — | — | 320 | 714 |
| | Yellowness (YI) | | | — | — | — | — | — | — | — |
| Granule moldability | Molding temperature | Glass transition temperature + 160° C. | — | C | — | D | E | E | C | C |
| | | Glass transition temperature + 170° C. | — | C | — | — | E | E | C | C |
| | | Glass transition temperature + 180° C. | — | C | C | — | E | E | C | C |

*N.D.: Not Detected

Referring to Table 1, the polyamides of Examples 1-10 had suitable melt viscosity and suitable terminal amino group concentrations. Therefore, they were capable of being dropped onto a belt press in a suitable particle size without adhering to the belt press. Additionally, yellowness was 10 or less, and thus was favorable.

On the other hand, referring to Table 2, the polyamides of Comparative Examples 1, 2, 6 and 7 had high melt viscosities and were difficult to be dropped onto the belt even when the molding temperature was increased. Meanwhile, the melt viscosity of the polyamide of Comparative Example 3 was too low such that no granular was formed on the belt press. Furthermore, although the polyamides of Comparative Examples 4 and 5 were capable of being dropped in suitable particle sizes, the terminal amino group concentrations were high and thus the dropped resin adhered to the belt and could not be removed from the belt after cooling.

By using the granulating method of the present invention, even a polyamide having a low melt viscosity that is difficult to be pelletized into a strand shape can be granulated, and a polyamide or a polyamide composition having uniform particle size and low yellowness can be obtained without cobwebbing or the like. The granules obtained according to the present invention can also favorably be used for a PET/MX nylon-blend bottle, paint and coating which require the granules to have a low molecular weight.

REFERENCE SIGNS LIST

10 Melt polymerization vessel
11 Distilled water receiving tank
12 Total condenser
13 Partial condenser
14 Hopper for comonomer
15 Diamine tank
16 Dicarboxylic acid tank
17 Agitator
20 Gear pump
30 Pastillator
40 Metal belt
50 Extruder
60 Material feeder
70 Rotator

The invention claimed is:
1. A method for granulating a polyamide, comprising the steps of:
melting polyamide (A), whose melt viscosity at glass transition temperature+160° C. and a shear rate of 100 s$^{-1}$ is 3 Pa·s to 200 Pa·s and whose terminal amino group concentration is 5 µeq/g to 70 µeq/g, by heating to a range of glass transition temperature+160° C. to glass transition temperature+180° C.; and
dropping the resultant in the molten state in granular forms onto a metal belt for solidification to obtain granules.
2. The method for granulating a polyamide according to claim 1, wherein polyamide (A) is polyamide (A1) which comprises a diamine unit containing an aromatic diamine unit represented by General Formula (I-1) below or an alicyclic diamine unit represented by General Formula (I-2) below for 70 mol % or more, and a dicarboxylic acid unit containing at least one of a linear aliphatic dicarboxylic acid unit represented by General Formula (II-1) below and an aromatic dicarboxylic acid unit represented by General Formula (II-2) below for a total of 50 mol % or more:

[Chemical 1]

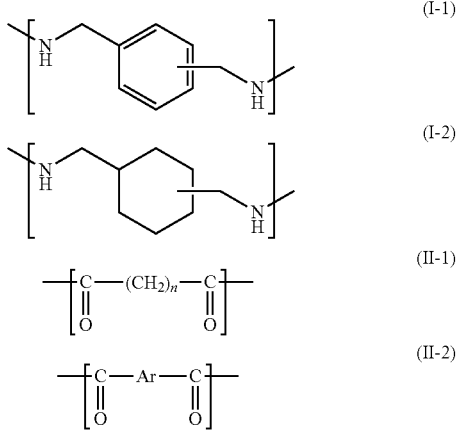

wherein, in Formula (II-1), n represents an integer of 2-18, and in Formula (II-2), Ar represents an arylene group.

3. The method for granulating a polyamide according to claim 1, wherein the number average molecular weight derived from the terminal group concentration of polyamide (A) is 2000 to 13000.

4. The method for granulating a polyamide according to claim 1, wherein a fore device of the metal belt comprises a normal pressure type or an applied pressure type melt polymerization vessel, and polyamide (A) in the molten state obtained by melt polymerization is continuously dropped in granular forms onto the metal belt and solidified to obtain granules.

5. The method for granulating a polyamide according to claim 1, wherein a fore device of the metal belt comprises a single-screw or a twin-screw extruder, and polyamide (A) in the molten state is continuously dropped in granular forms onto the metal belt and solidified to obtain granules.

6. A method for granulating a polyamide composition, comprising the steps of:
melting polyamide composition (B), which is obtained by mixing polyamide (A), whose melt viscosity at glass transition temperature+160° C. and a shear rate of 100 s$^{-1}$ is 3 Pa·s to 200 Pa·s and whose terminal amino group concentration is 5 µeq/g to 70 µeq/g, with at least one of additional resin (C) and additive (D), by heating to a range of glass transition temperature of polyamide (A)+160° C. to glass transition temperature of polyamide (A)+180° C.; and
dropping the resultant in the molten state in granular forms onto a metal belt for solidification to obtain granules.

7. The method for granulating a polyamide composition according to claim 6, wherein polyamide (A) is polyamide (A1) which comprises a diamine unit containing an aromatic diamine unit represented by General Formula (I-1) below or an alicyclic diamine unit represented by General Formula (I-2) below for 70 mol % or more, and a dicarboxylic acid unit containing at least one of a linear aliphatic dicarboxylic acid unit represented by General Formula (II-1) below and an aromatic dicarboxylic acid unit represented by General Formula (II-2) below for a total of 50 mol % or more:

[Chemical 2]

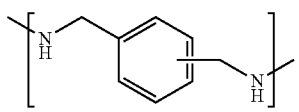 (I-1)

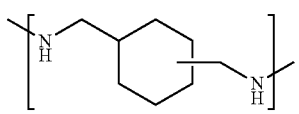 (I-2)

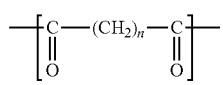 (II-1)

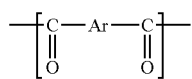 (II-2)

wherein, in Formula (II-1), n represents an integer of 2-18, and in Formula (II-2), Ar represents an arylene group.

8. The method for granulating a polyamide composition according to claim 6, wherein the number average molecular weight derived from the terminal group concentration of polyamide (A) is 2000 to 13000.

9. The method for granulating a polyamide composition according to claim 6, wherein a fore device of the metal belt comprises a single-screw or a twin-screw extruder, and after melt-blending polyamide (A) with at least one of additional resin (C) and additive (D), the resulting mixture in the molten state is continuously dropped in granular forms onto the metal belt and solidified to obtain granules.

* * * * *